(12) United States Patent
Hodgson et al.

(10) Patent No.: US 9,097,155 B2
(45) Date of Patent: Aug. 4, 2015

(54) DEVICE FOR TREATING EXHAUST GAS CONTAINING SOOT PARTICLES AND MOTOR VEHICLE HAVING THE DEVICE

(71) Applicant: EMITEC GESELLSCHAFT FUER EMISSIONSTECHNOLOGIE MBH, Lohmar (DE)

(72) Inventors: Jan Hodgson, Troisdorf (DE); Rolf Brueck, Bergisch Gladbach (DE); Christian Vorsmann, Cologne (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 71 days.

(21) Appl. No.: 13/896,935

(22) Filed: May 17, 2013

(65) Prior Publication Data

US 2013/0255231 A1 Oct. 3, 2013

Related U.S. Application Data

(63) Continuation of application No. PCT/EP2011/068222, filed on Oct. 19, 2011.

(30) Foreign Application Priority Data

Nov. 17, 2010 (DE) .......................... 10 2010 051 655

(51) Int. Cl.
*F01N 3/00* (2006.01)
*F01N 3/08* (2006.01)
(Continued)

(52) U.S. Cl.
CPC ................ *F01N 3/08* (2013.01); *F01N 3/0217* (2013.01); *F01N 3/0222* (2013.01); *F01N 3/0226* (2013.01); *F01N 3/0231* (2013.01);
(Continued)

(58) Field of Classification Search
USPC .................... 60/274, 275, 286, 295, 297, 311
See application file for complete search history.

(56) References Cited

U.S. PATENT DOCUMENTS 4,852,349 A * 8/1989 Abthoff et al. ................... 60/303
4,871,515 A * 10/1989 Reichle et al. ................ 422/174
(Continued)

FOREIGN PATENT DOCUMENTS

DE 19934932 A1 2/2001
DE 20122703 U1 3/2007
(Continued)

OTHER PUBLICATIONS

International Search Report of PCT/EP2011/068222, Dated May 22, 2012.

*Primary Examiner* — Binh Q Tran
(74) *Attorney, Agent, or Firm* — Laurence A. Greenberg; Werner H. Stemer; Ralph E. Locher

(57) ABSTRACT

A device for treating exhaust gas containing soot particles includes at least one ionization element for ionizing soot particles, at least one filter element having at least one section to which an electric potential can be applied and at least one agglomeration unit for at least partial agglomeration of electrically charged soot particles. The agglomeration unit is disposed between the ionization element and the filter element and the agglomeration unit has at least one outer pipe and at least one inner element. The filtering power of an exhaust system of an internal combustion engine is therefore increased by an increase in the agglomeration rate of the soot particles. A motor vehicle having the device is also provided.

20 Claims, 2 Drawing Sheets

(51) Int. Cl.
*F01N 3/021* (2006.01)
*F01N 3/022* (2006.01)
*F01N 3/023* (2006.01)
*F01N 3/027* (2006.01)
*F01N 3/033* (2006.01)
*F01N 3/10* (2006.01)
*F01N 13/00* (2010.01)

(52) U.S. Cl.
CPC .............. *F01N3/0275* (2013.01); *F01N 3/033* (2013.01); *F01N 3/106* (2013.01); *F01N 13/0097* (2014.06); *F01N 2240/28* (2013.01); *F01N 2330/32* (2013.01)

(56) References Cited

U.S. PATENT DOCUMENTS

| | | | |
|---|---|---|---|
| 4,945,721 A * | 8/1990 | Cornwell et al. | 60/274 |
| 7,198,762 B1 * | 4/2007 | Teboul | 422/174 |
| 7,331,170 B2 * | 2/2008 | Shimoda | 60/286 |
| 8,628,606 B2 * | 1/2014 | Hodgson et al. | 96/55 |
| 8,641,808 B2 * | 2/2014 | Bruck et al. | 96/68 |
| 2003/0086837 A1 | 5/2003 | Bruck et al. | |
| 2008/0072574 A1 | 3/2008 | Masuda et al. | |
| 2011/0214413 A1 | 9/2011 | Hodgson et al. | |
| 2012/0102926 A1 | 5/2012 | Maus | |

FOREIGN PATENT DOCUMENTS

| | | |
|---|---|---|
| DE | 102009026010 A1 | 1/2010 |
| EP | 1840938 A1 | 10/2007 |
| JP | 2002339734 A | 11/2002 |
| JP | 2003172123 A | 6/2003 |
| JP | 2004332609 A | 11/2004 |
| KR | 100527955 B1 | 11/2005 |
| WO | 0192692 A1 | 12/2001 |
| WO | 2007014650 A1 | 2/2007 |
| WO | 2010057779 A1 | 5/2010 |
| WO | 2010145931 A1 | 12/2010 |

* cited by examiner

FIG. 3
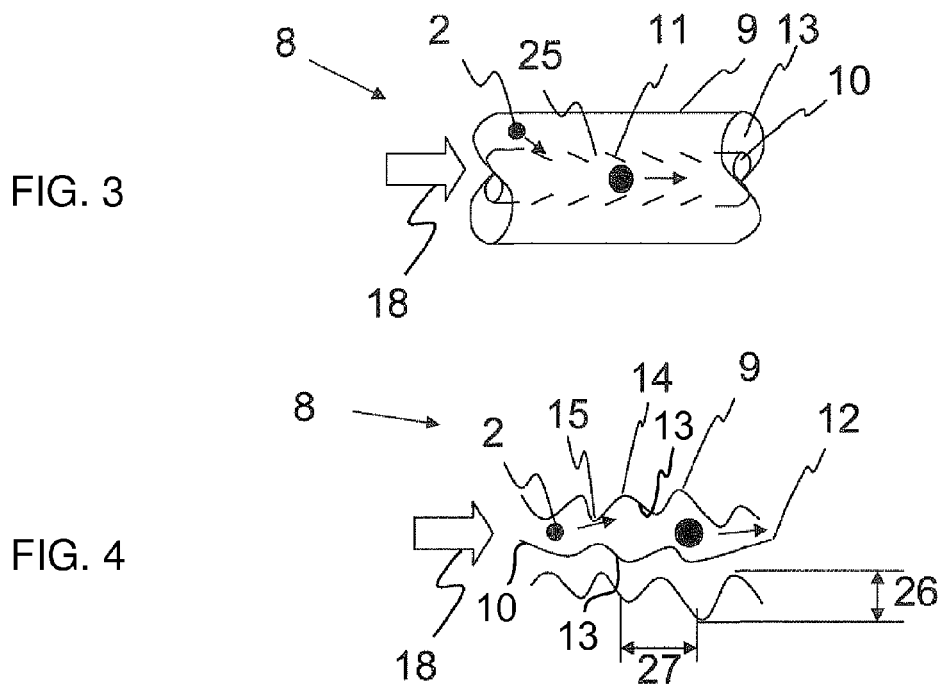
FIG. 4
FIG. 5
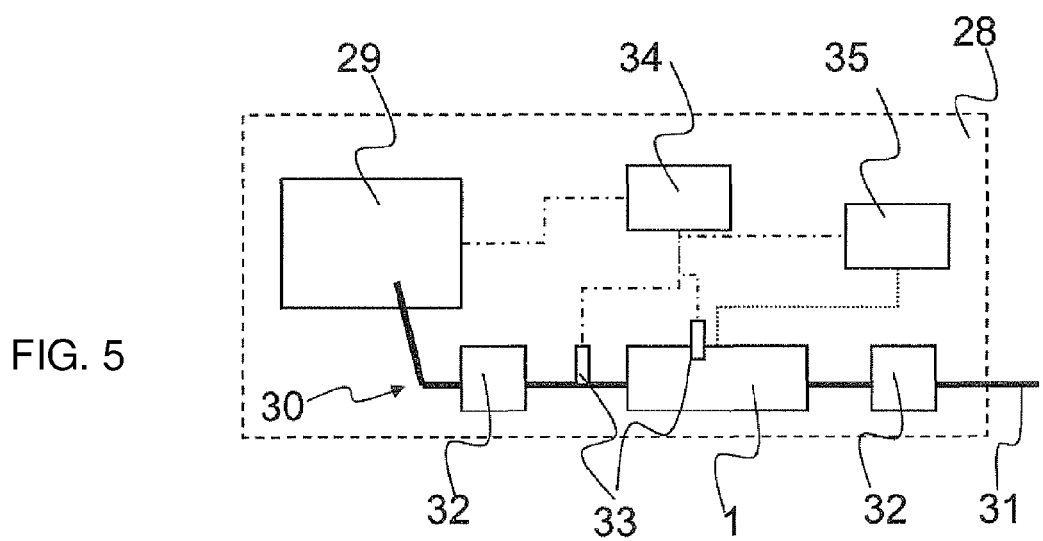

DEVICE FOR TREATING EXHAUST GAS CONTAINING SOOT PARTICLES AND MOTOR VEHICLE HAVING THE DEVICE

CROSS-REFERENCE TO RELATED APPLICATION

This application is a continuation, under 35 U.S.C. §120, of copending International Application No. PCT/EP2011/068222, filed Oct. 19, 2011, which designated the United States; this application also claims the priority, under 35 U.S.C. §119, of German Patent Application DE 10 2010 051 655.4, filed Nov. 17, 2010; the prior applications are herewith incorporated by reference in their entirety.

BACKGROUND OF THE INVENTION

Field of the Invention

The present invention relates to a device for the treatment of exhaust gas containing soot particles, in particular having a so-called electrostatic filter or electrofilter and having an agglomeration unit. The invention can be used, in particular, for the treatment of exhaust gases of mobile internal combustion engines in the automotive field, in particular for the treatment of exhaust gases arising from diesel fuel. The invention also relates to a motor vehicle having the device.

In motor vehicles with mobile internal combustion engines, and in particular in motor vehicles with a diesel engine, the exhaust gas generally contains increased amounts of soot particles, which should not be discharged into the atmosphere. That is predefined by corresponding exhaust-gas regulations which specify limit values for the number and mass of soot particles per unit weight of exhaust gas or per unit volume of exhaust gas and sometimes also for an overall motor vehicle. Soot particles are, in particular, unburned carbons and hydrocarbons in the exhaust gas.

Numerous different concepts for eliminating soot particles from exhaust gases of mobile internal combustion engines have already been discussed. Aside from alternately closed-off wall-flow filters, open bypass flow filters, gravity-driven separators, etc., systems have also already been proposed in which the particles in the exhaust gas are electrically charged and then deposited with the aid of electrostatic attraction forces. Those systems are known, in particular, under the name "electrostatic filters" or "electrofilters."

In the case of "electrofilters," an agglomeration of small soot particles to form larger soot particles and/or electrical charging of soot particles is effected through the provision of an electric field and/or a plasma. Electrically charged soot particles and/or relatively large soot particles are generally very easy to separate out in a filter system. Soot particle agglomerates, due to their relatively high mass inertia, are transported more inertly in an exhaust-gas flow and thus accumulate more easily at deflection points of an exhaust-gas flow. Electrically charged soot particles, due to their charge, are drawn towards surfaces on which they accumulate and dissipate their charge. That, too, facilitates the removal of soot particles from the exhaust-gas flow during the operation of motor vehicles.

Multiple emission electrodes and collector electrodes which are positioned in the exhaust line are generally proposed for such electrofilters. In this case, for example, a central emission electrode which extends approximately centrally through the exhaust line, and a surrounding lateral surface of the exhaust line as a collector electrode, are utilized to form a capacitor. With that configuration of emission electrode and collector electrode, an electric field is generated transversely with respect to the flow direction of the exhaust gas, in which case the emission electrode may be operated, for example, with a high voltage which lies in a range of approximately 15 kV. In that way, it is possible, in particular, for corona discharges to be generated through which the particles flowing with the exhaust gas through the electric field are subjected to a unipolar charge. Due to the charging, the particles travel, as a result of the electrostatic Coulomb forces, to the collector electrode.

Aside from systems in which the exhaust line is formed as a collector electrode, systems are also known in which the collector electrode is formed, for example, as a wire grid. In this case, the accumulation of particles on the wire grid serves the purpose of bringing the particles together, if appropriate, with further particles in order to thereby realize an agglomeration. The exhaust gas which flows through the grid then entrains the relatively large particles again and conducts them to classic filter systems.

In order to provide for the regeneration of filter systems, aside from intermittent regeneration by brief heating, that is to say combustion of the soot (catalytically motivated, oxidative conversion), it is also known for soot to be converted by nitrogen dioxide ($NO_2$). The advantage of the continuous regeneration with nitrogen dioxide is that, in that case, the conversion of soot can already take place at considerably lower temperatures (in particular lower than 250° C.). For that reason, continuous regeneration is preferred in many applications. That, however, leads to the problem that it must be ensured that the nitrogen dioxide in the exhaust gas comes into contact to an adequate degree with the accumulated soot particles.

In that context too, there are technical difficulties in realizing continuous operation of such exhaust systems in motor vehicles, in which the varying loads of the internal combustion engines lead to different exhaust-gas flows, exhaust-gas compositions and/or temperatures.

Furthermore, it must be taken into consideration that, for the provision of such components for such a soot separation system, components which are as simple as possible should be used, in particular also components which can be produced inexpensively by mass production. Furthermore, specifically for the construction of the electrodes, it should be taken into consideration that they must, if appropriate, be positioned in oriented fashion in the exhaust line, in particular in such a way that an undesirably high back pressure, or undesired turbulence of the exhaust gas in the region of the electrode, does not arise.

Even though the above-described systems have heretofore proven at least in tests to be suitable for the treatment of soot particles, the implementation of that concept for series operation in motor vehicles constitutes a major challenge. That is the case, in particular, with regard to the intensely fluctuating, intermittently very high soot loading in the exhaust gas and the reduction of the soot particle amount of extremely small particles with a diameter in the micrometer or sub-micrometer range.

SUMMARY OF THE INVENTION

It is accordingly an object of the invention to provide a device for treating exhaust gas containing soot particles and a motor vehicle having the device, which overcome the hereinafore-mentioned disadvantages and at least partially solve the highlighted problems of the heretofore-known devices and motor vehicles of this general type. It is sought, in particular, to specify a device for the treatment of exhaust gas containing soot particles, in which the device achieves a high separation rate for soot particles and, in particular, filters out of the exhaust gas even soot particles with a size of only a few hundred nanometers and greater.

With the foregoing and other objects in view there is provided, in accordance with the invention, a device for the treatment of exhaust gas containing soot particles. The device comprises at least:

- at least one ionization element for the ionization of soot particles,
- at least one filter element having at least one portion to which an electrical potential can be applied, and
- at least one agglomeration unit for the at least partial agglomeration of electrically charged soot particles, the agglomeration unit being disposed between the ionization element and the filter element and having at least one outer pipe and at least one inner element.

The device proposed herein may, in particular, be part of an exhaust system of a motor vehicle which has a diesel engine, and is disposed in particular in an exhaust line of the exhaust system.

Accordingly, the exhaust gas containing soot particles flows firstly through an ionization element which includes at least one electrode to which an electrical high voltage of between 3 kV [kilovolts] and 50 kV, preferably between 5 kV and 25 kV, can be applied. The voltage is, in particular, set or regulated or controlled in such a way that a corona discharge occurs between the electrode and a counter electrode. The ionization element may be formed as a simple emission electrode or bar electrodes, although it is preferable for the ionization element to include a honeycomb body with a multiplicity of ducts through which a flow can pass and at the inlet region or outlet region of which is disposed at least one electrode oriented in or counter to the flow direction. The honeycomb body may, in particular, be formed at least partially, preferably entirely, from an electrically conductive material, in such a way that an electrical potential can be applied to the honeycomb body and/or to the electrodes.

The exhaust gas containing charged soot particles subsequently flows through the agglomeration unit. The outer pipe of the agglomeration unit is considered in this case to be the element which delimits the exhaust-gas flow toward the outside. Within the context of the invention, the outer pipe may thus be a part of the exhaust line, a housing specifically assigned to the agglomeration unit, and/or a further element which delimits the exhaust-gas flow toward the outside (for example in the manner of a circumferentially delimiting sleeve). The outer pipe is thus traversed by a flow of the exhaust gas only on its inner side. By contrast, the exhaust gas flows around the inner element, at least in sections, on several sides (in particular at the outside and at the inside). In particular, the inner element is connected exclusively to the outer pipe for fastening. It is preferable for a bracket to be provided which fixes and/or orients the inner element in the outer pipe. It is also preferable for the inner element to be disposed in the outer pipe at a spacing from the latter. The spacing is at least 1 cm [centimeter], preferably at least 3 cm and, for example, for stability reasons and/or flow reasons (in particular in motor vehicle exhaust systems), the spacing should advantageously be no greater than 5 cm. The exhaust gas preferably flows completely around the inner element, in particular on all sides and, if appropriate, flow-guiding devices may be provided which induce a targeted local and/or uniform surrounding flow.

It is preferable for the agglomeration unit to have an axial length greater than half of the distance between the ionization element and the filter element.

The agglomeration unit may be grounded by the direct contact with the exhaust line. It is, however, preferable for the agglomeration unit to be able to be set at a defined electrical potential by using an electrical terminal, wherein in this case, the agglomeration unit is disposed so as to be electrically insulated with respect to the exhaust line. For this purpose, the agglomeration unit may be disposed within the exhaust line or may form a part of the exhaust line which is insulated in an axial direction with respect to the other part of the exhaust line. The agglomeration unit thus constitutes, at least in sections, the counter electrode to the at least one electrode of the ionization element. It is also preferable for the outer pipe and the inner element to be able to be set at different electrical potentials independently of one another.

It is alternatively proposed that the agglomeration unit is disposed in an electrically insulated fashion in the exhaust system, and that no electrical potential can be externally applied to the agglomeration unit. The charges borne by the soot particles thus cannot be dissipated. Nevertheless, in this case, the agglomeration unit may perform further functions in order to additionally promote the agglomeration, such as for example splitting of exhaust-gas flows and merging of exhaust-gas flows, diversion of exhaust-gas flows, impingement surfaces for exhaust-gas flows, etc.

The electrically charged soot particles accumulate on those surfaces of the agglomeration unit which are impinged upon by the exhaust gas, and in this case, can agglomerate with other soot particles before being entrained by the exhaust gas flowing past. The soot particles which are thus increased in terms of their mean diameter subsequently pass to the filter element which filters the soot particles out of the exhaust-gas flow. In this case, the agglomeration of the soot particles may also be realized by direct contact of the soot particles in flight through the agglomeration unit, in which suitable flow conditions therefor are created.

The filter element is preferably in the form of a surface-type separator which has a multiplicity of channels or ducts through which the exhaust gas can flow and which extend between an inlet region and an outlet region. By virtue of the fact that an electrical potential can be applied to at least one portion of the filter element, the filter element can be used as a counter electrode to the electrode of the ionization element, and furthermore, the soot particles deposited in the filter element can be neutralized. The ionization element, the agglomeration unit and the filter element may thus form a stepped electrical field (with different intensities), wherein the applied electrical voltages can be adapted to the respective exhaust-gas situation.

The filter element is particularly preferably a so-called open bypass flow filter in which there are no completely closed-off flow channels or ducts. The filter element is rather formed by a metallic nonwoven and metallic corrugated layers in which openings, guide structures, etc. are provided. In this case, the guide structures form flow constrictions in the flow passages, in such a way that the residence time or probability of impingement of soot particles in the interior of the filter element is increased. In this context, reference is made to published patent applications and patents of the Applicant of the instant application, which may be taken into consideration for the detailed characterization of the filter element and/or of the regeneration thereof. In this regard, reference is made, in particular, to the description in the following documents which are incorporated herein in their entirety: International Publication No. WO 01/80978, corresponding to U.S. Pat. No. 8,066,952; International Publication No. WO 02/00326, corresponding to U.S. Pat. No. 6,712,884; International Publication No. WO 2005/099867, corresponding to U.S. Pat. No. 7,959,868; International Publication No. WO 2005/066469, corresponding to U.S. Patent Application Publication No. 2007/006556; International Publication No. WO 2006/136431, corresponding to U.S. Patent Application Publication No. 2008/155967, and International Publication No. WO 2007/140932, corresponding to U.S. Pat. No. 8,066,787.

In this case, the regeneration of a filter element of this type preferably takes place continuously by using nitrogen dioxide on the basis of the CRT ("continuous regeneration trap") method. For this purpose, there may for example be positioned upstream of the device an oxidation catalytic converter in which (inter alia) nitrogen monoxide is oxidized to form nitrogen dioxide, which then reacts with the soot in the filter element. Furthermore, it is also possible for such an oxidative coating to be realized in the filter element itself, either in one zone thereof or else in all regions of the filter element.

The at least one inner element of the agglomeration unit preferably has areal sides (for example in the manner of an outer shell) and/or guide surfaces which, in particular, extend parallel to the exhaust-gas flow and/or locally at least partially oppose the exhaust-gas flow in order to deflect the latter.

In accordance with another feature of the invention, it is particularly preferable for the inner element to have recesses, in particular in the areal sides, for the exhaust gas to flow through, wherein the agglomeration of the soot particles takes place predominantly on the surfaces of the inner element. In this case, the edges of the recess are preferably shaped in such a way that the exhaust-gas flow is diverted so that an accumulation of the soot particles takes place on the surfaces of the inner element. In this case, there are normally provided a multiplicity of recesses which, for most applications, may have a substantially identical construction. It may, however, also be expedient for the size, shape and/or position with respect to the exhaust-gas flow to be varied in the case of a single inner element or multiple inner elements of the agglomeration device.

In accordance with a further feature of the invention, it is preferable for the at least one inner element to be in the form of an inner pipe. In this case, the (preferably cylindrical) inner pipe is preferably disposed concentrically in the (preferably cylindrical) outer pipe, wherein due to the form and/or positioning of the recesses in the inner pipe, too, it is achieved that a major part of the exhaust gas flows through the inner pipe from the outside to the inside through the recesses. An advantageous deposition of the soot particles on the (inner) surfaces of the inner pipe is achieved in this way.

In accordance with an added feature of the invention, the at least one inner element has a multiplicity of guide plates. The guide plates are disposed in such a way that the exhaust gas is diverted so that a deposition of the soot particles advantageously takes place on the surfaces of the guide plates themselves and/or on the surface of the inner element. At least some of the guide plates may be disposed adjacent recesses. The guide plates may furthermore be formed so as to differ from one another with regard to height and/or inclination with respect to the surface of the inner element. It is furthermore preferable for the guide plates to be formed in one piece with the inner element, that is to say to be formed from the same material (for example in the manner of punched-out portions or turned-out portions).

In accordance with an additional advantageous feature of the invention, the at least one inner element forms a type of labyrinth. As a result of the labyrinthine configuration of the guide plates and/or recesses and/or inner pipe(s), the surface with which the particles in the exhaust gas can come into contact as flow passes through the agglomeration unit, is enlarged. This in turn results in an increase in the number of soot particles deposited on the surface. A labyrinth is attained, in particular, by a multiplicity of guide plates disposed transversely with respect to the flow direction and offset with respect to one another in the flow direction, wherein the overall flow cross section of the agglomeration unit is covered by the entirety of all of the guide plates. A characteristic of such a labyrinth may be that the exhaust-gas flow is subjected to multiple flow diversions as it flows through the at least one inner element, wherein if appropriate (repeated) splitting-up and merging of multiple partial exhaust-gas flows may also occur.

In accordance with yet another advantageous feature of the invention, at least the outer pipe or the at least one inner element has a surface with elevations and depressions. The elevations and depressions preferably extend substantially transversely with respect to the flow direction of the exhaust gas, whereby the flow close to the surface is incited to form turbulence. The elevations and/or depressions may be formed in the manner of studs, indentations, corrugations, etc., and in particular have a dimension which corresponds to at least several times the material thickness of the outer pipe and/or of the inner element. As a result of the turbulence, there are generated on the surface of the agglomeration unit regions in which soot particles are preferentially deposited and agglomerate. In particular, in the event of a change in the flow situation, the agglomerated soot particles are detached from their deposition point by the exhaust-gas flow.

In accordance with yet a further feature of the invention, it is furthermore preferable for the elevations and depressions to vary at least in terms of amplitude or spacing in a flow direction. In this case, the spacing of the elevations and depressions is measured in a flow direction, and the amplitude is measured transversely with respect to the flow direction. Due to such a construction, a particularly high proportion of soot particles is agglomerated in all flow situations.

In accordance with yet an added feature of the invention, the agglomeration unit has a cooling device. By virtue of the agglomeration unit being cooled, the proportion of soot particles which are deposited on the agglomeration unit and which subsequently agglomerate is increased. The cooling device is preferably on the outside of the agglomeration unit and may be realized by a deflection of cooling air and/or by Peltier elements and/or a liquid cooling medium.

In accordance with yet an additional feature of the invention, in order to promote the detachment of the agglomerated soot particles from the surfaces of the agglomeration unit, it is also proposed that the agglomeration unit include a vibration device. Such a vibration device may, for example, be mounted on the agglomeration unit outside the exhaust-gas flow and, by way of suitable devices such as, for example, piezo elements, stimulate the agglomeration unit to perform vibrations.

With the objects of the invention in view, there is concomitantly provided a motor vehicle, comprising an internal combustion engine, an exhaust system, and a device of the type described herein according to the invention being integrated into the exhaust system. In particular, suitable voltage sources, electrical connecting lines, control units, etc., are provided for this purpose.

Other features which are considered as characteristic for the invention are set forth in the appended claims, noting that the features specified individually in the claims may be combined with one another in any desired technologically expedient manner and form further embodiments of the invention.

Although the invention is illustrated and described herein as embodied in a device for treating exhaust gas containing soot particles and a motor vehicle having the device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3 is a plan view of another embodiment of the agglomeration unit;

FIG. 4 is a plan view of a further embodiment of the agglomeration unit; and

FIG. 5 is a block diagram of an integration variant of the device in a motor vehicle.

DETAILED DESCRIPTION OF THE INVENTION

Figure 1:
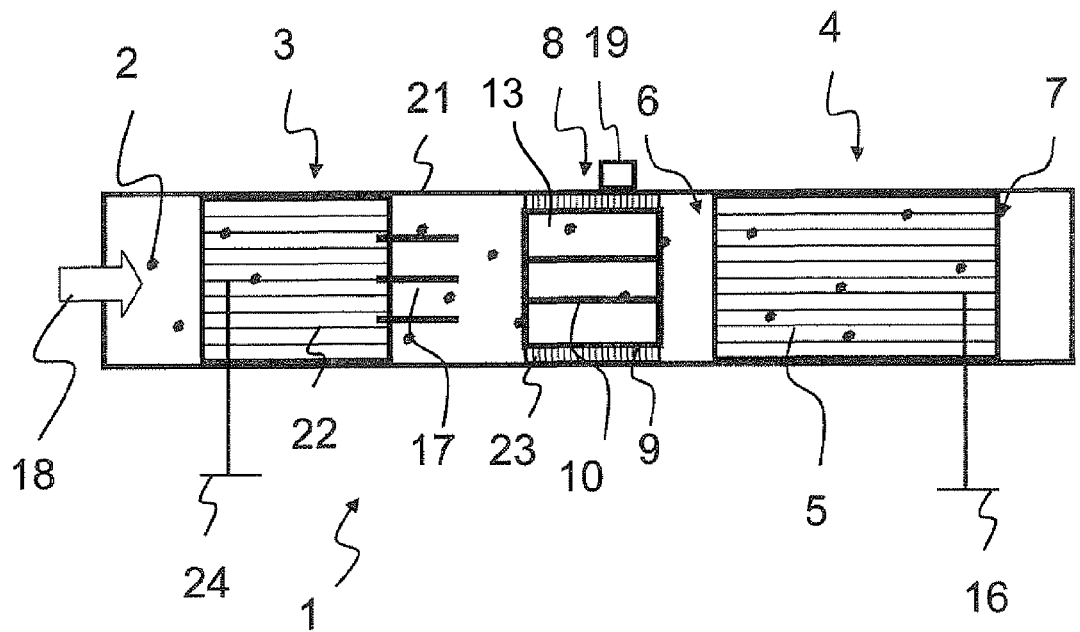
FIG. 1 is a diagrammatic, longitudinal-sectional view of an embodiment of the device according to the invention.

Referring now to the figures of the drawings in detail and first, particularly, to FIG. 1 thereof, there is seen a diagrammatic illustration of an embodiment of a device 1 according to the invention for the treatment of exhaust gas containing soot particles 2. An ionization element 3, an agglomeration unit 8 and a filter element 4 are disposed in an exhaust line 21 along a flow direction 18. The ionization element 3 includes an electrically conductive honeycomb body 22 with a multiplicity of electrodes 17. A voltage can be applied to the electrodes through an electrical ionization element terminal 24. The agglomeration unit 8 has an inner element 10 and an outer pipe 9 and the outer pipe 9 is surrounded by a cooling device 23. Furthermore, the agglomeration unit 8 has a vibration device 19. The filter element 4 has a multiplicity of channels or ducts 5 through which the exhaust gas can flow and which extend between an inlet region 6 and an outlet region 7. An electrical potential can be applied to the filter element 4 through an electrical filter element terminal 16. The exhaust line 21 is disposed in an exhaust system of a motor vehicle.

During operation, exhaust gas containing soot particles 2 flows firstly through the ionization element 3, in which the exhaust-gas flow is homogenized by the honeycomb body 22 which has channels or ducts through which a flow can pass. In the region between the ionization element 3 and the agglomeration unit 8, the soot particles 2 are ionized in a corona discharge proceeding from the electrodes 17. The charged soot particles 2 pass with the exhaust-gas flow, and with the electrical potential between the electrodes 17 and the agglomeration unit 8, to the agglomeration unit 8. As a result of mechanical and electrostatic forces, the charged soot particles 2 are deposited on a surface 13 of the agglomeration unit 8. The number of accumulated soot particles 2 is increased as a result of the flow guidance in the agglomeration unit 8. The agglomerated soot particles 2 are detached by the following exhaust gas and pass into the filter element 4, in such a way that a detachment may be caused by vibrations generated by the vibration device 19. An application of an electrical potential to the filter element 4 through the electrical filter element terminal 16 firstly promotes the outflow of the particle agglomerates from the agglomeration unit 8 to the filter element 4, and secondly increases the deposition of the charged agglomerated soot particles 2 in the filter element 4.

Figure 2:
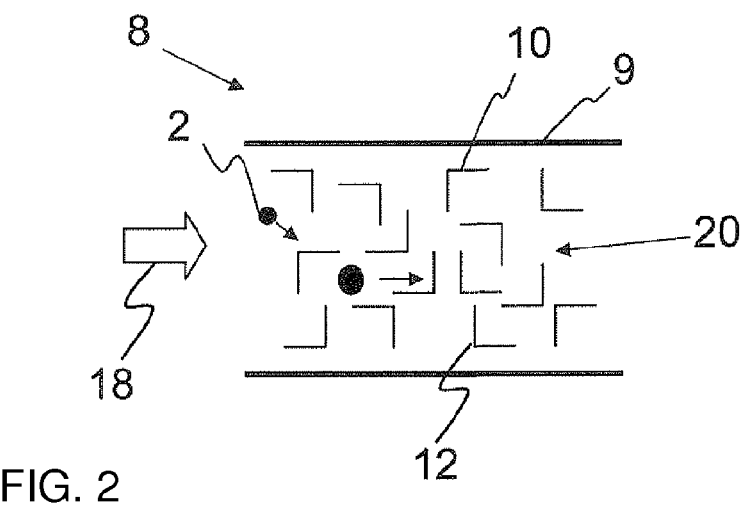
FIG. 2 is an enlarged, longitudinal-sectional view of an embodiment of an agglomeration unit.

FIG. 2 diagrammatically shows a longitudinal-sectional illustration of an embodiment of the agglomeration unit 8. The agglomeration unit 8 includes an outer pipe 9 and inner elements 10. The inner elements 10 are formed by guide plates 12 which are disposed in the form of a labyrinth 20. Surfaces of the guide plates 12 extend in two dimensions and each form one areal side. The exhaust gas which flows-in in the flow direction 18 and which contains charged soot particles is diverted by the guide plates 12. Due to the relatively high mass, the soot particles cannot necessarily follow the deflection and thus pass to the surface of the guide plates 12, where the soot particles are deposited and, if appropriate, agglomerate with other soot particles. The thus agglomerated soot particles, when they have reached a certain overall size and thus pose a certain overall flow resistance, are detached from the accumulation point again by the exhaust gas flowing past. The agglomeration rate of the soot particles 2 is thus increased as a result of the labyrinthine configuration of the guide plates 12.

FIG. 3 diagrammatically shows another advantageous embodiment of the agglomeration unit 8 with an outer pipe 9 and an inner element 10 formed as an inner pipe 11. An inner side and an outer side of the inner pipe 11 each form an areal side. The inner pipe 11 has recesses 25 through which the exhaust gas containing soot particles can flow. The recesses 25 are shaped in such a way that the exhaust gas preferentially flows from an outer side of the inner pipe 11 into the interior of the inner pipe 11. As a result, the soot particles 2 are preferentially deposited on the surfaces of the inner pipe 11.

FIG. 4 diagrammatically shows a further embodiment of the agglomeration unit 8. The outer pipe 9 and the inner element 10 have elevations 14 and depressions 15. As a result of the elevations 14 and depressions 15, a turbulent exhaust-gas flow is generated by which the soot particles 2 pass into the vicinity of the surfaces 13 of the outer pipe 9 and of the inner element 10, where the soot particles 2 accumulate and can, if appropriate, agglomerate. It is also shown therein that the amplitude 26 and/or the spacing 27 of the elevations 14 and/or depressions 15 may vary, in particular in such a way that the amplitude 26 and/or the spacing 27 increases in the flow direction 18. The curved surfaces of the inner element 10 each form an areal side.

FIG. 5 is a block diagram of a motor vehicle 28 having an internal combustion engine 29. The exhaust gas produced in the internal combustion engine 29 during the operation of the motor vehicle 28 is then conducted, together with the soot particles, through an exhaust system 30. The exhaust system 30 is formed by an exhaust-gas line 31 in which the device 1 according to the invention is provided in addition to multiple exhaust-gas treatment units 32 (for example catalytic converters, adsorbers, flow mixers, etc.). The device 1 is operated with a voltage source 35 which is regulated by a control unit 34, for example also with the involvement of sensors 33 of the exhaust system 30.

With the present invention, the filtering performance of an exhaust system of an internal combustion engine is increased by an increase of the agglomeration rate of the soot particles 2.

The invention claimed is:

1. A device for the treatment of exhaust gas containing soot particles, the device comprising:
   at least one ionization element for the ionization of soot particles;
   at least one filter element having at least one portion to which an electrical potential can be applied; and at least one agglomeration unit for at least partial agglomeration of electrically charged soot particles, said at least one agglomeration unit disposed between said at least one ionization element and said at least one filter element, said at least one agglomeration unit having at least one outer pipe and at least one inner element, said outer pipe delimiting an exhaust gas flow of the exhaust gas towards an outside of said at least one agglomeration unit such that only an inner side of said outer pipe is traversed by the exhaust gas flow, said at least one inner element being disposed in said outer pipe and disposed for having the exhaust gas flow flow around said at least one inner element, at least in sections, on several sides of said at least one inner element.

2. The device according to claim 1, wherein said at least one inner element has recesses configured to allow the exhaust gas to flow through, and said at least one inner element is configured to cause the agglomeration to take place predominantly thereon.

3. The device according to claim 1, wherein said at least one inner element is in the form of an inner pipe.

4. The device according to claim 1, wherein said at least one inner element has a multiplicity of guide plates.

5. The device according to claim 1, wherein said at least one inner element forms a labyrinth.

6. The device according to claim 1, wherein at least said at least one outer pipe or said at least one inner element has a surface with elevations and depressions.

7. The device according to claim 6, wherein said elevations and said depressions vary at least in terms of amplitude or spacing in a flow direction.

8. The device according to claim 1, wherein said at least one agglomeration unit has a cooling device.

9. The device according to claim 1, wherein said at least one agglomeration unit includes a vibration device.

10. A motor vehicle, comprising:
an internal combustion engine;
an exhaust system associated with said internal combustion engine; and
a device according to claim 1 being integrated into said exhaust system.

11. The device according to claim 1, wherein said at least one outer pipe and said at least one inner element are set at different electric potentials.

12. The device according to claim 1, wherein said at least one inner element is disposed in said outer pipe such that said exhaust gas flow flows around an inside and an outside of said at least one inner element.

13. A device for the treatment of exhaust gas containing soot particles, the device comprising:
at least one ionization element for the ionization of soot particles;
at least one filter element having at least one portion to which an electrical potential can be applied; and
at least one agglomeration unit for at least partial agglomeration of electrically charged soot particles, said at least one agglomeration unit disposed between said at least one ionization element and said at least one filter element, said at least one agglomeration unit having at least one outer pipe and at least one inner element, said at least one agglomeration device being constructed for increasing a mean diameter of soot particles such that soot particle exiting said at least one agglomeration device have a larger mean diameter than soot particles entering said at least one agglomeration unit.

14. The device according to claim 13, wherein said at least one inner element has recesses configured to allow the exhaust gas to flow through, and said at least one inner element is configured to cause the agglomeration to take place predominantly thereon.

15. The device according to claim 13, wherein said at least one inner element is in the form of an inner pipe.

16. The device according to claim 13, wherein said at least one inner element has a multiplicity of guide plates.

17. The device according to claim 13, wherein said at least one inner element forms a labyrinth.

18. The device according to claim 13, wherein at least said at least one outer pipe or said at least one inner element has a surface with elevations and depressions.

19. The device according to claim 18, wherein said elevations and said depressions vary at least in terms of amplitude or spacing in a flow direction.

20. The device according to claim 13, wherein said at least one outer pipe and said at least one inner element are set at different electric potentials.

* * * * *